United States Patent
Kondo et al.

(10) Patent No.: US 8,845,830 B2
(45) Date of Patent: Sep. 30, 2014

(54) METHOD OF MANUFACTURING HEAVY-WALL SEAMLESS STEEL PIPE

(75) Inventors: Kunio Kondo, Sanda (JP); Yuji Arai, Amagasaki (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/354,609

(22) Filed: Jan. 20, 2012

(65) Prior Publication Data

US 2012/0118441 A1    May 17, 2012

Related U.S. Application Data

(63) Continuation of application No. PCT/JP2010/005134, filed on Aug. 20, 2010.

(30) Foreign Application Priority Data

Aug. 21, 2009 (JP) ................. 2009-192117

(51) Int. Cl.

| | |
|---|---|
| C21D 8/10 | (2006.01) |
| C21D 9/14 | (2006.01) |
| C22C 38/02 | (2006.01) |
| C22C 38/26 | (2006.01) |
| C22C 38/04 | (2006.01) |
| C22C 38/24 | (2006.01) |
| C22C 38/46 | (2006.01) |
| C22C 38/48 | (2006.01) |
| C22C 38/22 | (2006.01) |
| C22C 38/06 | (2006.01) |
| C22C 38/42 | (2006.01) |
| C22C 38/44 | (2006.01) |
| C21D 1/42 | (2006.01) |

(52) U.S. Cl.
CPC . *C21D 9/14* (2013.01); *C22C 38/02* (2013.01); *C22C 38/26* (2013.01); *C22C 38/04* (2013.01); *C22C 38/24* (2013.01); *C22C 38/46* (2013.01); *C22C 38/48* (2013.01); *C21D 8/105* (2013.01); *C22C 38/22* (2013.01); *C22C 38/06* (2013.01); *C22C 38/42* (2013.01); *C22C 38/44* (2013.01); *C21D 1/42* (2013.01)
USPC ............ 148/570; 148/575; 148/590; 148/593

(58) Field of Classification Search
USPC ......... 148/570, 574, 575, 590–593, 654, 909, 148/903, 567
See application file for complete search history.

(56) References Cited

U.S. PATENT DOCUMENTS 3,692,591 A  *  9/1972  Dabkowski et al. .......... 148/575

FOREIGN PATENT DOCUMENTS

| CN | 1039621 | 2/1990 |
|---|---|---|
| CN | 1251786 | 5/2000 |
| CN | 1690241 | 11/2005 |
| CN | 101151387 | 3/2008 |
| CN | 101168794 | 4/2008 |
| CN | 101481780 | 7/2009 |
| JP | 52-140407 | 11/1977 |
| JP | 52-140407 A * | 11/1977 |
| JP | 60-116725 | 6/1985 |
| JP | 62-270725 | 11/1987 |
| JP | 64-28328 | 1/1989 |
| JP | 04-191326 | 7/1992 |
| JP | 404358026 A * | 12/1992 |
| JP | 8-104922 | 4/1996 |
| JP | 10-024320 | 1/1998 |
| JP | 2001-205351 | 7/2001 |
| JP | 2006-274350 | 10/2006 |
| JP | 2007-154289 | 6/2007 |

OTHER PUBLICATIONS

Derwent publication, English abstract of Japanese patent No. 52-140407 A, Nov. 24, 1977.*

* cited by examiner

*Primary Examiner* — Deborah Yee

(74) *Attorney, Agent, or Firm* — Clark & Brody

(57) ABSTRACT

A steel pipe with a wall thickness over 30 mm is subjected to heat treatment of quenching and tempering using a temperature range of at least not less than 750° C. during the heating stage, makes it possible to obtain a heavy-wall seamless steel pipe having excellent toughness by resulting grain refinement. Quenching is by performing water cooling after heating the steel pipe to a temperature in the range of not less than 900° C. to not more than 1000° C. by using, as a heating means, induction heating at a frequency of not more than 200 Hz. Tempering is performed at a temperature in the range of not less than 500° C. to not more than 750° C. Preferably, after the heating by induction heating, a soaking treatment is performed in the temperature range of not less than 900° C. to not more than 1000° C. for 10 minutes or less followed by water cooling.

17 Claims, No Drawings

METHOD OF MANUFACTURING HEAVY-WALL SEAMLESS STEEL PIPE

TECHNICAL FIELD

The present invention relates to a method of manufacturing a heavy-wall seamless steel pipe. More particularly, the present invention relates to a method of manufacturing a seamless steel pipe with excellent toughness, in particular, of a heavy-wall steel pipe.

"A heavy-wall seamless steel pipe" mentioned in the present invention refers to a seamless steel pipe whose wall thickness exceeds 30 mm irrespective of its outside diameter.

BACKGROUND ART

Seamless steel pipes are used in the drilling of oil and gas wells of crude oil, natural gas and the like (hereinafter, these are collectively referred to simply as "oil wells") or used in transmission etc. thereof. In recent years, in association with the development of oil wells in deeper seas, the performance required for seamless steel pipes used as transmission pipes has become rigorous, while demand for heavy-wall seamless steel pipes has been increasing. In general, when the wall thickness of seamless steel pipes increases, it becomes difficult to ensure toughness, let alone to obtain high strength.

[Method of Manufacturing Seamless Steel Pipe]

A seamless steel pipe can be manufactured, for example, by the Mannesmann process. This process includes the steps of:

(1) piercing-rolling a billet by a piercing-rolling mill (a piercer) to form a blank pipe (hereinafter, referred to as a "hollow shell");
(2) elongation-rolling the hollow shell by an elongation-rolling mill (for example, a mandrel mill);
(3) sizing the elongated hollow shell by a sizing mill (for example, a sizer); and
(4) ensuring strength and toughness in the steel pipe by heat treatment (for example, quenching step followed by tempering step).

[Prior Art]

It is well known that in general, when steel products are subjected to thermal refining, grains become refined and toughness is improved. Therefore, in order to secure strength and toughness in heavy-wall seamless steel pipes, the heat treatment of (4) above is particularly important.

In thermal refining, in general, an atmosphere temperature control type heating furnace is used which heats materials to be heat treated by the atmosphere heated in the furnace by use of burners. However, when thermal refining by an atmosphere temperature control type heating furnace is applied to steel pipes with heavy wall thickness (hereinafter, referred to as heavy-wall steel pipes), an expected level of grain refinement may not be achieved in some cases, with the result that the toughness of the steel pipes decreases.

On the other hand, the following heat treatment methods have been disclosed as techniques for carrying out the heat treatment of steel pipes by induction heating in order to ensure toughness.

Patent Literature 1 proposes a heat treatment method which involves heating a steel pipe, which is obtained by rolling and forming a billet in heated condition, by induction heating from temperatures of not more than 500° C. to the temperature range from $Ac_3$ point to 1000° C. and quenching the steel pipe, and thereafter performing tempering in the temperature range from 450° C. to $Ac_1$ point, thereby improving the low-temperature toughness of the steel pipe.

Patent Literature 2 proposes a heat treatment method which involves induction heating a steel pipe, which is obtained by rolling and forming a billet in heated condition, to temperatures in the range of 850° C. to 1050° C., and quenching the steel pipe by performing water cooling at cooling rates of not less than 100° C./s from austenite territory, thereby improving the toughness of the steel pipe.

Although Patent Literatures 1 and 2 above propose the use of induction heating in quenching, these do not propose the frequency or heating rate of induction heating, and are not directed to a heavy-wall seamless steel pipe. Therefore, even when the heat treatment methods proposed in Patent Literatures 1 and 2 are applied to the heat treatment of a heavy-wall seamless steel pipe, it is impossible to sufficiently ensure the toughness of a steel pipe to be obtained.

Patent Literature 3 proposes a method by which, in the heat treatment of a clad steel pipe consisting of dissimilar metals, one in the outer circumference and the other in the inner circumference of the steel pipe, induction heating is performed by using a coil which is arranged surrounding the outer surface of the steel pipe and heats an outer circumference side metal and a coil which is inserted into the bore of the steel pipe and heats an inner circumference side metal, thereby heating the outer circumference side and inner circumference side of the steel pipe, respectively, at a different temperature. The frequency of induction heating disclosed in Patent Literature 3 is in the range of 1000 Hz to 3000 Hz.

Patent Literature 4 proposes a heating method in an in-line heat treatment of a seam portion of an ERW steel pipe. This heating method includes the steps of:

(1) heating a seam portion to a temperature in the range of 600° C. to 700° C. by induction heating at a frequency in the range of 700 Hz to 3000 Hz;
(2) subsequently, heating the seam portion to a temperature in the range of 700° C. to 750° C. by induction heating at a frequency in the range of 700 Hz to 800 Hz; and
(3) lastly, heating the seam portion to a temperature in the range of 900° C. to 1050° C. by induction heating at a frequency in the range of 700 Hz to 3000 Hz.

It is stated that by using the induction heating (1) to (3) above, while keeping lower the temperature on the inner circumference side of the seam portion, the outer circumference side is heated to a prescribed temperature, and the input energy is reduced.

Patent Literature 5 proposes a method by which, in the manufacture of an ERW steel pipe, after the whole steel pipe is heated by induction heating at a frequency of less than 100 kHz in forming the seam portion by a solid-phase pressure welding, the welded portion of the steel pipe is heated by induction heating at a frequency of not less than 100 kHz.

Patent Literatures 3 to 5 above disclose methods of heating a steel pipe by induction heating, and induction heating at a high frequency in the range of 700 Hz to 100 kHz is used. All the Patent Literatures 3 to 5 describe methods aimed at heating the surface of a steel pipe or along with the substrate to a specific depth, and even if these methods are applied to the heat treatment of a heavy-wall seamless steel pipe, the grains of the steel pipe are not refined and, therefore, it is impossible to sufficiently ensure the toughness of a steel pipe to be obtained.

CITATION LIST

Patent Literature

Patent Literature 1: Japanese Patent Application Publication No. 08-104922

Patent Literature 2: Japanese Patent Application Publication No. 2007-154289

Patent Literature 3: Japanese Patent Application Publication No. 64-28328

Patent Literature 4: Japanese Patent Application Publication No. 60-116725

Patent Literature 5: Japanese Patent Application Publication No. 10-24320

SUMMARY OF INVENTION

Technical Problem

As described above, in recent years, with demand for heavy-wall seamless steel pipes increasing, the performance required for heavy-wall seamless steel pipes has become rigorous. On the other hand, with conventional heat treatment methods, it is impossible to ensure the toughness satisfying the performance requirements for heavy-wall seamless steel pipes. The present invention was made in view of this situation, and it is an object of the present invention to provide a method of manufacturing a seamless steel pipe having stable toughness, in particular, directed to heavy-wall steel pipes.

Solution to Problem

As described above, the application of thermal refining by an atmosphere temperature control type heating furnace to heavy-wall seamless steel pipes raises a problem that the toughness in obtained steel pipes decreases. An investigation into the cause of this phenomenon revealed the following:

(1) In the case of radiation heating of a heavy-wall steel pipe, it takes time for heat to transfer from the outer surface to the inner surface and, therefore, there occurs a limit to the heating rate.

(2) Because of a large heat capacity of a heavy-wall steel pipe, when a heavy-wall steel pipe is put in a heat treatment furnace as a material to be heat treated, the furnace temperature drops significantly. Accordingly, the steel pipe is heated from this state, so the heating rate becomes tremendously low.

Owing to (1) and (2) above, even when a conventional thermal refining by an atmosphere temperature control type heating furnace is applied to a heavy-wall seamless steel pipe, more heating time is required and the toughness of the obtained heavy-wall seamless steel pipe decreases without achieving the refinement of the grain size of the steel pipe.

Consequently, an investigation was made into a heat treatment using induction heating as a method of uniformly rapidly heating even a heavy-wall steel pipe. As a result, it became evident that in order to uniformly rapidly heat a steel pipe having a wall thickness exceeding 30 mm, it is necessary to reduce the frequency of induction heating considerably. Concretely, it became evident that the frequency of not more than 200 Hz has to be employed.

Next, as a result of an investigation into a temperature region in which rapid heating is mandatory, it became evident that rapid heating in the temperature range of not less than 750° C. is effective in grain refinement. Therefore, it is preferred that up until 600-750° C., heating be performed by an ordinary atmosphere temperature control type heating furnace and that thereafter rapid heating be performed by induction heating. As a result of this, it is possible to produce an effect of effective grain refinement in an obtained heavy-wall seamless steel pipe while allowing the energy input amount to be reduced during the heating of the steel pipe.

Furthermore, it became evident that pinning effect is produced by performing specific heating, first, heated in an atmosphere temperature control type heating furnace, and second, rapidly heated by switching to induction heating, with the result that the coarsening of grains of steel pipes can be prevented. Because of heating in the ordinary atmosphere temperature control type heating furnace at a temperature in the tempering region, carbides of alloy element(s) precipitate finely owing to the tempering effect. This is the reason for the above phenomenon.

The process after hot rolling before applying thermal refining is also important. That is, immediately after hot working or after soaking at a prescribed temperature, a steel pipe is water cooled. As a result of this, the steel pipe obtains a metal microstructure mainly composed of martensite or bainite. It became evident that when this steel pipe is subjected to thermal refining, grains of the steel pipe can be further refined.

It became evident that in thermal refining involving quenching and tempering, the toughness of an obtained steel pipe is improved by adding a quenching treatment between quenching and tempering. This is because the grains of the steel pipe are further refined by repeating quenching by induction heating for the steel pipe.

The present invention was completed on the basis of the above-described findings, and the invention consists in, as the gist thereof, the methods of manufacturing a seamless steel pipe given in (1) to (8) below:

(1) A method of manufacturing a heavy-wall seamless steel pipe comprising subjecting a steel pipe with a wall thickness over 30 mm to a quench-and-tempering treatment process comprising a quenching step (a) and a tempering step (b) as below, in the order as described, the pipe being made through a pipe making step by hot working:

(a) a quenching step that involves heating the steel pipe to a temperature in the range of not less than 900° C. to not more than 1000° C. by using, as a heating means, induction heating at a frequency of not more than 200 Hz specifically in a temperature range of at least not less than 750° C. during the heating stage, and subsequently performing quenching by water cooling; and (b) a tempering step that involves performing tempering at a temperature in the range of not less than 500° C. to not more than 750° C.

(2) The method of manufacturing a heavy-wall seamless steel pipe described in item (1) wherein the quenching step further involves a soaking treatment in a temperature range of not less than 900° C. to not more than 1000° C. for 10 minutes or less between the induction heating and the quenching.

(3) The method of manufacturing a heavy-wall seamless steel pipe described in item (1) or (2), wherein in performing heating in the quenching step the steel pipe is preliminarily heated from room temperature to a temperature in the range of not less than 600° C. to not more than 750° C. by using an atmosphere temperature control type heating furnace.

(4) The method of manufacturing a heavy-wall seamless steel pipe described in item (2) or (3), wherein the soaking treatment is performed in an atmosphere temperature control type heating furnace.

(5) The method of manufacturing a heavy-wall seamless steel pipe described in any one of items (1) to (4), wherein the seamless steel pipe to be subjected to the quench-and-tempering treatment process is water cooled from a temperature of not less than $Ar_3$ point after pipe making by hot working.

(6) The method of manufacturing a heavy-wall seamless steel pipe described in any one of items (1) to (4), wherein the seamless steel pipe to be subjected to the quench-and-tempering treatment process is soaked at a temperature in the range of not less than 900° C. to not more than 1000° C. and is subsequently water cooled after pipe making by hot working.

(7) The method of manufacturing a heavy-wall seamless steel pipe described in any one of items (1) to (6), wherein the quench-and-tempering treatment involves an additional quenching step as set forth in any one of items (1) to (4) between the quenching step as set forth in any one of items (1) to (6) and the tempering step.

(8) The method of manufacturing a heavy-wall seamless steel pipe described in any one of items (1) to (7), wherein in performing the induction heating, the seamless steel pipe is induction heated without being transferred in a longitudinal direction during heating by using an induction heating device having a coil length longer than the length of the steel pipe to be induction heated.

Advantageous Effects of Invention

The method of manufacturing a heavy-wall seamless steel pipe of the present invention produces remarkable effects described below by heating a steel pipe by induction heating at a frequency of not more than 200 Hz in the quenching step:
(1) It is possible to uniformly rapidly heat a steel pipe having a heavy wall thickness.
(2) It is possible to refine grains in a steel pipe.
(3) It is possible to ensure high toughness in a heavy-wall seamless steel pipe to be obtained.

DESCRIPTION OF EMBODIMENTS

The method of manufacturing a heavy-wall seamless steel pipe of the present invention will be described below.

The heavy-wall seamless steel pipe directed by the present invention can be manufactured by using a pipe-making step of obtaining a steel pipe from a billet as well as a quenching step and a tempering step as heat treatment. Although in the method of manufacturing a heavy-wall seamless steel pipe of the present invention, the pipe making method is not especially specified, it is possible to obtain a steel pipe by performing piercing rolling, elongation rolling and sizing by the above-described Mannesmann process.

In the method of manufacturing a heavy-wall seamless steel pipe of the present invention, it is necessary that a steel pipe obtained by pipe making be subjected to heat treatment in which the quenching step and the tempering step, in the order as described, are performed. The quenching step and the tempering step, which are features of the present invention, will be described in detail below.
1. Quenching Step In the method of manufacturing a heavy-wall seamless steel pipe of the present invention, it is necessary that in the quenching step, a steel pipe be heated to a temperature in the range of not less than 900° C. to not more than 1000° C. by using, as a heating means, induction heating at a frequency of not more than 200 Hz specifically in a temperature range of at least not less than 750° C. along a heating stage, and subsequently quenching by water cooling be performed.

It is necessary that the frequency to be used in induction heating should be low in order to uniformly rapidly heat a steel pipe from outside up to the inner surface thereof. The upper limit of the frequency for induction heating is 200 Hz, more preferably not more than 100 Hz, and yet more preferably not more than 60 Hz.

In the present invention, the heating specifically in a temperature range of at least not less than 750° C. along the heating stage is performed by the above-described induction heating. Applying induction heating from room temperature is not prohibited. The important point is to perform rapid heating in a temperature range of not less than 750° C. to a quenching temperature or the vicinity thereof. Therefore, in a temperature range from room temperature to not more than 750° C., either induction heating may be used or heating by a conventional atmosphere temperature control type heating furnace may be used. This is because at temperatures of not more than $Ac_1$ transformation point, the effect of grain refinement is negligibly-small even when the heating rate is increased.

It is necessary that a steel pipe be heated by induction heating to a temperature in the range of not less than 900° C. to not more than 1000° C. As a result of heating to not less than 900° C., the microstructure of the steel pipe comes to a single phase of austenite and grain refinement becomes remarkable. However, if the heating temperature exceeds 1000° C., grain coarsening occurs and, therefore, the heating temperature of induction heating is set in the range of not less than 900° C. to not more than 1000° C.

In a preferred embodiment of the present invention, induction heating is used as a heating means specifically in a temperature range of at least not less than 750° C. during the heating stage, and an atmosphere temperature control type heating furnace is used in heating in a low-temperature region. In this case, the heating by an atmosphere temperature control type heating furnace is finished at temperatures of not more than 750° C. and is switched over to induction heating. Usually, during traveling from an atmosphere temperature control type heating furnace to an induction heating device, a temperature drop of the steel pipe may occasionally occur, although being in connection with a configuration of the production line. Therefore, in this case, the temperature of the steel pipe at the time that the induction heating should be started becomes lower than the previously reached temperature of the steel pipe in the atmosphere temperature control type heating furnace. This is exemplified by the case where the steel pipe is heated to 710° C. by the atmosphere temperature control type heating furnace, a temperature drop occurs while the steel pipe travels to the induction heating furnace, and the starting temperature of induction heating becomes 680° C.

In this embodiment, a steel pipe is heated by an atmosphere temperature control type heating furnace preferably to a temperature in the range of not less than 600° C. to not more than 750° C. In this case, the temperature of the steel pipe at which induction heating is started falls within the range of not less than 560° C. to not more than 710° C. if the above-described temperature drop during the traveling of the steel pipe is supposed to be, for example, 40° C.

In the manufacturing method of the present invention, the heating time of induction heating, which is not especially specified, is preferably not more than 5 minutes, more preferably not more than 3 minutes, and yet more preferably not more than 1 minute. This is because the shorter the heating time, the more grain refinement will be accomplished.

In the manufacturing method of the present invention, the heating rate of induction heating is not especially specified.

The higher the heating rate of induction heating, the more preferable it will be. The average heating rate from 750° C. to 900° C. is preferably not less than 50° C./minute, more preferably not less than 100° C./minute, and yet more preferably not less than 200° C./minute.

Although not especially specified in the manufacturing method of the present invention, it is preferred that a steel pipe rotates during induction heating. This is because the steel pipe is more uniformly heated by this rotation.

In the quenching step specified in the present invention, it is necessary to perform quenching by water cooling after the heating by induction heating. Because rapid cooing is required, it is necessary to carry out cooling by use of a device which rapidly cools the inner and outer surfaces of a steel pipe simultaneously along the overall length thereof Although there is no limit to the specifications of the equipment, it is possible to adopt, for example, an equipment which immerses the outer surface of a steel pipe in a water tank or permits the shower cooling of the outer surface while introducing a high-speed jet flow onto the inner surface of the rotating steel pipe.

2. Tempering Step

In the manufacturing method of the present invention, the tempering step is provided after the quenching step, and a steel pipe is tempered in the range of not less than 500° C. to not more than 750° C. By performing the tempering step, it is possible to adjust strength in the steel pipe and at the same time it is possible to improve toughness. In the present invention, there is no special restriction in heating conditions during tempering, and tempering is performed by heating to a temperature in the range of not less than 500° C. to not more than 750° C., i.e., not more than $Ac_1$ point.

According to the manufacturing method of the present invention, by performing the above-described quenching step and tempering step in the order as described, it is possible to uniformly rapidly heat a heavy-wall steel pipe in the quenching step and at the same time it is possible to adjust strength in the steel pipe in the tempering step. This enables the grains of the steel pipe to be refined and excellent toughness to be ensured in an obtained heavy-wall seamless steel pipe.

3. Embodiment of Quenching Step

In the manufacturing method of the present invention, in the quenching step embodiments (1) to (5) below can be applied in order to further improve the toughness of a steel pipe to be obtained:

(1) Soaking after Induction Heating

In the manufacturing method of the present invention, it is preferred that in the quenching step, a steel pipe be heated by induction heating to a temperature in the range of not less than 900° C. to not more than 1000° C. and be further subjected to a soaking treatment in a temperature range of not less than 900° C. to not more than 1000° C. for 10 minutes or less, and subsequently quenching be performed by water cooling. This is because although as described above, a steel pipe of high toughness can be obtained by performing water cooling immediately after reaching to the temperature in the induction heating, it is possible to obtain a steel pipe having higher toughness and to reduce performance variations, by applying soaking in connection to the induction heating and performing water cooling thereafter.

In the manufacturing method of the present invention, a soaking treatment can be performed in a temperature range of not less than 900° C. to not more than 1000° C. This is because it is preferred that the temperature of a soaking treatment be the same as that of induction heating. Also, for a time period of a soaking treatment, soaking can be performed for 10 minutes or less. This is because if the soaking time exceeds 10 minutes, grain coarsening occurs and toughness decreases.

(2) Heating by Atmosphere Temperature Control Type Heating Furnace (2)-1. Preliminary Heating by Atmosphere Temperature Control Type Heating Furnace Before Quenching In the manufacturing method of the present invention, it is preferred that in performing the heating of the quenching step, preliminary heating be performed by using an atmosphere temperature control type heating furnace in a temperature range from room temperature to a temperature in the range of not less than 600° C. to not more than 750° C., and thereafter switching over to induction heating, heating to a temperature in the range of 900 to 1000° C. is successively performed. This is because: although it is important to increase the heating rate as much as possible in order to refine grains, the effect of refinement is negligibly-small at temperatures of not more than a transformation point even if the heating rate is increased; therefore, if heating is performed by an atmosphere temperature control type heating furnace in a temperature region of not more than a transformation point, it becomes possible to reduce the input energy during heating and the energy cost can be reduced.

It is preferred that when the heating by an atmosphere temperature control type heating furnace is applied in combination along heating in a quenching stage as described above, this heating be applied to a temperature range from room temperature to a temperature in the range of not less than 600° C. to not more than 750° C. This is because the cost reducing effect remains small if the heating by an atmosphere temperature control type heating furnace is performed only to less than 600° C., while if the heating temperature exceeds 750° C., transformation starts with the result that the effect of the grain refinement by the heat treatment becomes very small.

Besides, the heating rate at temperatures of not more than a transformation point is reduced by performing heating by an atmosphere temperature control type heating furnace in a temperature range from room temperature to a temperature in the range of not less than 600° C. to not more than 750° C. In the case of a steel containing carbide-forming elements such as Ti and Nb, the lower heating rate at temperatures of not more than a transformation point allows the carbides contained in the steel to precipitate finely. As a result, it is possible to suppress the coarsening of grains by the pinning after transformation to austenite.

Although not especially specified in the manufacturing method of the present invention, as a preferred heating pattern by an atmosphere temperature control type heating furnace, it is preferred that in the case of heating, for example, to 600° C., heating from 550° C. to 600° C. be performed for 300 seconds or more. Similarly, in the case of heating to 650° C., it is preferred that heating from 600° C. to 650° C. be performed for 28 seconds or more.

(2)-2. Soaking by Atmosphere Temperature Control Type Heating Furnace

In the manufacturing method of the present invention, it is preferred that the soaking treatment after induction heating in (1) above be performed in an atmosphere temperature control type heating furnace. This is because compared to the case where an induction heating device is used in the soaking treatment, the energy input amount can be reduced by using an atmosphere temperature control type heating furnace in the soaking treatment.

(3) Water Cooling after Pipe Making

In the manufacturing method of the present invention, it is preferred that a seamless steel pipe to be treated by quenching be water cooled from temperatures of not less than $Ar_3$ point immediately after pipe making by hot working. This is because: by quenching the steel pipe after pipe making from temperatures of not less than $Ar_3$ point, the microstructure of the steel pipe becomes composed of mainly martensite or bainite; and when this steel pipe is subjected to the quenching step and the tempering step thereafter, the grains of the seamless steel pipe become further refined.

In the manufacturing method of the present invention, it is preferred that after pipe making by hot working, a seamless steel pipe to be heated for quenching be water cooled after being further soaked at a temperature in the range of not less than 900° C. to not more than 1000° C. This is because by performing quenching by water cooling after the soaking of a seamless steel pipe in the above-described temperature range after pipe making, the steel pipe is subjected to the quenching step specified in the above Section 1. "Quenching step" and the tempering step specified in the above Section 2. "Tempering step", whereby the grains can be made finer and performance variation can be reduced.

(4) Repeatedly Addition of Quenching Step

In the manufacturing method of the present invention, it is preferred that a second quenching step using induction heating be added in a repeated manner between a first quenching step and a tempering step. This is because by repeatedly applying the quenching step to an obtained steel pipe and performing tempering, the grains become finer and excellent toughness is obtained.

(5) Induction Heating Device

In the manufacturing method of the present invention, it is preferred that in performing the induction heating, a seamless steel pipe be induction heated without being traveled in a longitudinal direction during heating by using an induction heating device having a coil length larger than the length of the steel pipe to be induction heated. There has been frequently adopted such an induction heating device that induction heating is performed while a steel pipe travels in a longitudinal direction through a shorter-length coil. This is because: if an induction heating device using a coil shorter than the length of a steel pipe to be heat treated is used in the present invention, it is impossible to ensure a sufficient cooling rate in the cooling to be performed thereafter; and, therefore, it is impossible to ensure sufficient toughness in the steel pipe.

EXAMPLES

The following test was conducted in order to verify the effect of the method of manufacturing a heavy-wall seamless steel pipe of the present invention.

Example 1

Quenching Evaluation Test by Induction Heating

Heavy-wall seamless steel pipes were quenched and tempered by the method of manufacturing a heavy-wall seamless steel pipe of the present invention, and test pieces were prepared from the obtained heavy-wall seamless steel pipes. The effect of quenching using induction heating was verified by measuring toughness in the test pieces.

[Test Method]

In both Inventive Examples and Comparative Examples, seamless steel pipes made of Steel A or Steel B with a wall thickness of 40 mm were made using a model mill and steel pipes were obtained. The pipe making completes at a finishing temperature of 1050° C. by the model mill. Table 1 shows the chemical compositions of Steel A and Steel B used in the testing.

TABLE 1

| | Chemical compositions of tested materials (mass %, the balance: Fe) | | | | | | | | | |
|---|---|---|---|---|---|---|---|---|---|---|
| Steel | C | Si | Mn | Cu | Ni | Cr | Mo | V | Al | Nb |
| Steel A | 0.05 | 0.26 | 1.4 | 0.2 | 0.2 | 0.25 | 0.3 | 0.04 | 0.026 | 0.018 |
| Steel B | 0.26 | 0.23 | 0.4 | — | — | 1.1 | 0.7 | 0.06 | 0.029 | 0.025 |

In the Inventive Examples, as shown in Table 2, the steel pipes obtained were processed according to the following procedure:

(1) the steel pipes were cooled by releasing in air without performing the soaking treatment after pipe making;

(2) the steel pipes were heated to a prescribed temperature in an atmosphere temperature control type heating furnace and further heated by induction heating to a prescribed temperature, held at the prescribed temperature for 3 minutes, and thereafter water cooled, whereby quenching was performed; and (3) the steel pipes were heated to a prescribed temperature, held for 15 minutes at the prescribed temperature and thereafter air cooled, whereby tempering was performed.

In Comparative Examples 1-3 to 1-8, heavy-wall seamless steel pipes were obtained by changing conditions for quenching in (2) in the procedure of the Inventive Examples of (1) to (3) above. In Comparative Examples 1-3 and 1-6, the steel pipes were heated to a prescribed temperature merely in an atmosphere temperature control type heating furnace and thereafter water cooled, whereby quenching was performed. In Comparative Examples 1-4 and 1-7, quenching was performed by using a high frequency, which is outside the specified range of the present invention, for the induction heating. Furthermore, in Comparative Examples 1-5 and 1-8, quenching was performed by heating to high temperatures outside the specified range of the present invention.

In the induction heating of the steel pipes, a coil longer than the steel pipe length was prepared to heat the whole steel pipe, instead of using a pipe-traveling type system. The atmosphere temperature control type heating furnace used was the one such that materials to be heat-treated are heated by heating the atmosphere in the furnace by use of burners.

[Evaluation Procedure]

For an evaluation procedure for toughness, an impact test was conducted according to a Charpy impact test method for metallic materials specified in JIS Z2242. The impact test specimens were in accordance with No. 4 test coupon specified in JIS Z2242, and 10 mm×10 mm test specimens with a 2 mm V-notch were taken along a longitudinal direction in the middle of the wall thickness of a seamless steel pipe.

Table 2 shows the steels tested in the Inventive Examples and Comparative Examples, the cooling conditions after pipe making, the treatment conditions of the quenching step, the heating conditions in the tempering step, and the levels of toughness obtained from the impact test (the fracture transition temperature vTs: ° C., the lower the better toughness is).

TABLE 2

| Division | | Steel | Cooling conditions after pipe making | | Treatment conditions of quenching step | | | | | Heating condition in tempering | Toughness vTs (°C.) |
|---|---|---|---|---|---|---|---|---|---|---|---|
| | | | Soaking after pipe making | Cooling | Atmosphere temperature control type heating furnace | Induction heating | Induction heating frequency (Hz) | Heating rate (°C./minute) | Soaking treatment | | |
| Inventive Example | 1-1 | A | None | Standing to cool | Room temperature to 725° C. | 670° C. to 950° C. | 60 | 300 | 950° C. × 3 minutes | 600° C. | −71 |
| Inventive Example | 1-2 | B | None | Standing to cool | Room temperature to 700° C. | 670° C. to 950° C. | 60 | 330 | 950° C. × 3 minutes | 710° C. | −74 |
| Comparative Example | 1-3 | A | None | Standing to cool | Room temperature to 920° C. | None | None | 3.4 | None | 600° C. | −41 |
| Comparative Example | 1-4 | A | None | Standing to cool | None | Room temperature to 920° C. | 10k | 150 | None | 600° C. | −33 |
| Comparative Example | 1-5 | A | None | Standing to cool | None | Room temperature to 1150° C. | 60 | 200 | None | 600° C. | −17 |
| Comparative Example | 1-6 | B | None | Standing to cool | Room temperature to 990° C. | None | None | 4.3 | None | 710° C. | −58 |
| Comparative Example | 1-7 | B | None | Standing to cool | None | Room temperature to 910° C. | 10k | 150 | None | 710° C. | −39 |
| Comparative Example | 1-8 | B | None | Standing to cool | None | Room temperature to 1160° C. | 60 | 200 | None | 710° C. | −25 |

Notes)
In the quenching step, cooling was performed by water cooling after heating or soaking.
In the tempering step, after heating to a prescribed temperature, the temperature was held for 15 minutes and air cooling was performed.

[Test Results]

From the results shown in Table 2, the heating rate in Comparative Examples 1-3 and 1-6 was 3.4° C./minute and 4.3° C./minute, respectively, in which heating was performed by using an atmosphere temperature control type heating furnace alone in the quenching step, whereas heating rates in Inventive Examples 1-1 and 1-2 were 300° C./minute and 330° C./minute, respectively. The toughness of Comparative Examples 1-3 and 1-6 was −41° C. and −58° C. in terms of vTs, respectively, whereas the toughness of Inventive Examples 1-1 and 1-2 was −71° C. and −74° C., respectively. Therefore, the toughness was improved by the present invention. From this, it could be ascertained that the use of induction heating enables steel pipes to be heated at high rates and also enables the toughness of obtained heavy-wall seamless steel pipes to be improved.

From the results shown in Table 2, even when induction heating is used in the quenching step, the toughness of Comparative Examples 1-4 and 1-7 is −33° C. and −39° C. in terms of vTs, respectively, whereas the toughness of Inventive Examples 1-1 and 1-2 is −71° C. and −74° C., respectively. Therefore, the toughness could be dramatically improved by the present invention. Consequently, steel pipes can be uniformly rapidly heated by using induction heating at a frequency of not more than the specified frequency of the present invention and hence it could be ascertained that it is possible to improve the toughness of obtained heavy-wall seamless steel pipes.

From the results shown in Table 2, the toughness of Comparative Examples 1-5 and 1-8 in which heating was performed in the quenching step to a temperature outside the range of the present invention is −17° C. and −25° C., respectively, whereas the toughness of Inventive Examples 1-1 and 1-2 is −71° C. and −74° C., respectively. Therefore, the toughness could be dramatically improved by the present invention. Consequently, it could be ascertained that it is possible to improve the toughness of obtained heavy-wall seamless steel pipes by heating the steel pipes in the quenching step to the temperature range specified in the present invention.

Example 2

Evaluation Test of Soaking and Water Cooling after Pipe Making

Testing was conducted to evaluate an improvement in the toughness of heavy-wall seamless steel pipes by quenching the steel pipes by water cooling or quenching the steel pipes by water cooling after a soaking treatment after pipe making.

[Test Method]

In Example 2, steel pipes obtained by pipe making were processed according to the following procedure:

(1) after pipe making, steel pipes were directly quenched by water cooling from 1000° C. or, otherwise, subjected to soaking to a prescribed temperature, and subsequently quenched by water cooling;

(2) steel pipes were heated to a prescribed temperature by induction heating alone or, otherwise, after preliminary heating by an atmosphere temperature control type heating furnace, induction heating was applied to the prescribed temperature;

(3) quenching is performed by applying water cooling to steel pipes either immediately after reaching to the temperature in the induction heating, or after soaking at a prescribed temperature during the induction heating for 3 minutes or transferring to an atmosphere temperature control type heating furnace, heating and holding at a prescribed temperature for 3 minutes there; and (4) tempering was performed such that steel pipes were heated to a prescribed temperature and held for 15 minutes, followed by air cooling.

Note that, in examples in which the heated temperature in induction heating is the same as the soaking temperature, soaking was carried out by induction heating, and in examples in which the heated temperature in induction heating is different from the soaking temperature, soaking was carried out by transferring the steel pipes to an atmosphere temperature control type heating furnace.

The conditions other than those described above were the same as in Example 1. For an evaluation procedure of heavy-wall seamless steel pipes, the same method as in Example 1 was used to carry out an investigation of toughness. Table 3 shows the steels tested in the Inventive Examples and Comparative Examples, the cooling conditions after pipe making, the treatment conditions of the quenching step, the heating conditions in the tempering step, and the levels of toughness obtained from the impact test (vTs, ° C.).

these facts, it could be ascertained that it is possible to improve the toughness of heavy-wall seamless steel pipes obtained by further soaking steel pipes at a temperature in the range of not less than 900° C. to not more than 1000° C. after pipe making by hot working and performing water cooling.

Example 3

Evaluation Test for Repeatedly Addition of Quenching Step

Testing was conducted to evaluate an improvement in toughness of heavy-wall seamless steel pipes obtained by

TABLE 3

| | | Cooling conditions after pipe making | | Treatment conditions of quenching step | | | | | Tough-ness |
|---|---|---|---|---|---|---|---|---|---|
| | | | | Atmosphere | Induction | Heating | | Heating | |
| Division | Steel | Soaking after pipe making | Cooling | temperature control type heating furnace | Induction heating | heating frequency (Hz) | rate (° C./minute) | Soaking treatment | condition in tempering | vTs (° C.) |
| Inventive Example 2-1 | A | 950° C. × 3 minutes | Water cooling | None | Room temperature to 950° C. | 60 | 250 | None | 600° C. | −78 |
| Inventive Example 2-2 | A | 950° C. × 3 minutes | Water cooling | Room temperature to 700° C. | 670° C. to 950° C. | 50 | 300 | None | 600° C. | −88 |
| Inventive Example 2-3 | A | 970° C. × 3 minutes | Water cooling | Room temperature to 680° C. | 660° C. to 950° C. | 40 | 300 | 950° C. × 3 minutes | 600° C. | −77 |
| Inventive Example 2-4 | A | 970° C. × 3 minutes | Water cooling | None | Room temperature to 930° C. | 50 | 330 | 950° C. × 3 minutes | 600° C. | −73 |
| Inventive Example 2-5 | A | None | Water cooling | Room temperature to 700° C. | 670° C. to 950° C. | 50 | 330 | 950° C. × 3 minutes | 600° C. | −82 |
| Inventive Example 2-6 | A | None | Water cooling | Room temperature to 725° C. | 680° C. to 980° C. | 40 | 250 | None | 600° C. | −83 |
| Inventive Example 2-7 | B | 950° C. × 3 minutes | Water cooling | None | Room temperature to 950° C. | 60 | 300 | 950° C. × 3 minutes | 710° C. | −79 |
| Inventive Example 2-8 | B | 950° C. × 3 minutes | Water cooling | Room temperature to 700° C. | 670° C. to 950° C. | 50 | 300 | None | 710° C. | −81 |
| Inventive Example 2-9 | B | 970° C. × 3 minutes | Water cooling | None | Room temperature to 930° C. | 50 | 300 | 930° C. × 3 minutes | 710° C. | −79 |

Notes)
In the quenching step, cooling was performed by water cooling after heating or soaking.
In the tempering step, after heating to a prescribed temperature, the temperature was held for 15 minutes and air cooling was performed.

[Test Results]

From the results shown in Table 3, the toughness of Inventive Examples 2-5 and 2-6 in which water cooling was performed without soaking after pipe making was −82° C. and −83° C. in terms of vTs, respectively, whereas the toughness of Inventive Example 1-1 of Example 1 in which air cooling was performed without soaking after pipe making was −71° C. The temperature of Steel A at Ar₃ point is 780° C. Therefore, it could be ascertained that it is possible to improve the toughness of heavy-wall seamless steel pipes obtained by performing water cooling from temperatures of not less than the Ar₃ point after pipe making by hot working.

From the results shown in Table 3, when Steel A is used, the toughness of heavy-wall seamless steel pipes which were soaked after pipe making and subsequently water cooled (Inventive Examples 2-1 to 2-4) is −73° C. to −88° C., whereas the toughness of Inventive Example 1-1 of Example 1 in which air cooling was performed without soaking after pipe making is −71° C. When Steel B is used, the toughness of heavy-wall seamless steel pipes which were soaked after pipe making and thereafter water cooled (Inventive Examples 2-7 to 2-9) is −79° C. to −81° C., whereas the toughness of Inventive Example 1-2 of Example 1 in which air cooling was performed without soaking after pipe making is −74° C. From repeatedly adding another quenching step between a first quenching step and a tempering step.

[Test Method]

In Example 3, steel pipes obtained by pipe making were processed according to the following procedure:

(1) after pipe making, the steel pipes were cooled by any one of the methods: (a) cooling by air cooling, (b) directly quenching by water cooling from 1000° C., and (c) quenching by water cooling after soaking at a prescribed temperature;

(2) steel pipes were heated to a prescribed temperature by induction heating alone, or otherwise, by performing induction heating after preliminary heating by an atmosphere temperature control type heating furnace;

(3) quenching was performed by water cooling either immediately after reaching to the prescribed temperature in the induction heating, or after soaking by holding at a prescribed temperature for 3 minutes in the heating;

(4) again, heating and quenching by water cooling are performed in a repeated manner such that either immediately after reaching to the temperature in a second induction heating, or after soaking by holding at the prescribed temperature during the induction heating for 3 minutes or by transferring to an atmosphere temperature control type heating furnace, and holding at a prescribed temperature for 3 minutes there; and (5) tempering was performed such that the steel pipes were heated to a prescribed temperature and air cooled after holding at the temperature for 15 minutes.

The conditions other than those described above were the same as in Example 1. For an evaluation procedure of heavy-wall seamless steel pipes, the same method as in Example 1 was used to carry out an investigation of toughness. Table 4 shows the steels tested in the Inventive Examples and Comparative Examples, the cooling conditions after pipe making, the treatment conditions of a first quenching step, the treatment condition of a second quenching step, the heating conditions in the tempering step, and the levels of toughness obtained from the impact test (vTs, ° C.).

TABLE 4

| | | Cooling after pipe making | | Treatment conditions of first quenching step | | | | |
|---|---|---|---|---|---|---|---|---|
| Division | Steel | Soaking | Cooling | Atmosphere temperature control type heating furnace | Induction heating | Frequency (Hz) | Heating rate (° C./minute) | Soaking treatment |
| Inventive Example | 3-1 | A | None | Standing to cool | None | Room temperature to 940° C. | 60 | 300 | 940° C. × 3 minutes |
| | 3-2 | A | None | Standing to cool | None | Room temperature to 950° C. | 50 | 270 | 950° C. × 1 minute |
| | 3-3 | A | None | Standing to cool | Room temperature to 730° C. | 710° C. to 940° C. | 60 | 320 | 940° C. × 1 minute |
| | 3-4 | B | None | Standing to cool | None | Room temperature to 950° C. | 50 | 300 | 950° C. × 3 minutes |
| | 3-5 | B | None | Standing to cool | None | Room temperature to 950° C. | 60 | 270 | 950° C. × 1 minute |
| | 3-6 | B | None | Standing to cool | Room temperature to 700° C. | 680° C. to 950° C. | 60 | 320 | 950° C. × 1 minute |
| | 3-7 | A | None | Water cooling | None | Room temperature to 950° C. | 40 | 250 | 950° C. × 3 minutes |
| | 3-8 | B | None | Water cooling | None | Room temperature to 960° C. | 50 | 250 | 960° C. × 3 minutes |
| | 3-9 | A | 940° C. | Water cooling | Room temperature to 725° C. | 680° C. to 950° C. | 50 | 330 | 950° C. × 3 minutes |
| | 3-10 | A | 950° C. | Water cooling | Room temperature to 700° C. | 670° C. to 920° C. | 60 | 330 | 920° C. × 3 minutes |
| | 3-11 | A | 940° C. | Water cooling | Room temperature to 680° C. | 660° C. to 920° C. | 60 | 350 | 920° C. × 3 minutes |
| | 3-12 | A | 950° C. | Water cooling | Room temperature to 700° C. | 670° C. to 950° C. | 50 | 280 | 950° C. × 3 minutes |
| | 3-13 | B | 940° C. | Water cooling | Room temperature to 670° C. | 650° C. to 950° C. | 50 | 330 | None |
| | 3-14 | B | 950° C. | Water cooling | Room temperature to 700° C. | 670° C. to 920° C. | 60 | 280 | 920° C. × 3 minutes |
| | 3-15 | B | 940° C. | Water cooling | Room temperature to 680° C. | 660° C. to 930° C. | 50 | 300 | 930° C. × 3 minutes |
| | 3-16 | B | 950° C. | Water cooling | Room temperature to 700° C. | 670° C. to 940° C. | 50 | 300 | 940° C. × 3 minutes |

| | | Treatment conditions of second quenching step | | | | | | |
|---|---|---|---|---|---|---|---|---|
| Division | Steel | Atmosphere temperature control type heating furnace | Induction heating | Frequency (Hz) | Heating rate (° C./minute) | Soaking treatment | Heating condition in tempering | Toughness vTs (° C.) |
| Inventive Example | 3-1 | None | Room temperature to 920° C. | 50 | 260 | 910° C. × 3 minutes | 600° C. | −110 |
| | 3-2 | Room temperature to 720° C. | 700° C. to 940° C. | 60 | 310 | 930° C. × 1 minutes | 600° C. | −111 |
| | 3-3 | None | Room temperature to 950° C. | 60 | 280 | 930° C. × 1 minutes | 600° C. | −113 |

TABLE 4-continued

| | | | | | | | | |
|---|---|---|---|---|---|---|---|---|
| 3-4 | B | None | Room temperature to 930° C. | 50 | 250 | 920° C. × 3 minutes | 600° C. | −103 |
| 3-5 | B | Room temperature to 730° C. | 710° C. to 950° C. | 60 | 330 | 940° C. × 1 minute | 600° C. | −122 |
| 3-6 | B | None | Room temperature to 940° C. | 40 | 270 | 920° C. × 1 minutes | 600° C. | −125 |
| 3-7 | A | Room temperature to 700° C. | 680° C. to 930° C. | 60 | 280 | 920° C. × 3 minutes | 600° C. | −102 |
| 3-8 | B | Room temperature to 740° C. | 710° C. to 940° C. | 30 | 320 | 930° C. × 3 minutes | 600° C. | −108 |
| 3-9 | A | None | Room temperature to 920° C. | 50 | 280 | None | 600° C. | −105 |
| 3-10 | A | Room temperature to 730° C. | 700° C. to 910° C. | 40 | 330 | None | 600° C. | −108 |
| 3-11 | A | None | Room temperature to 920° C. | 50 | 280 | 920° C. × 3 minutes | 600° C. | −100 |
| 3-12 | A | Room temperature to 700° C. | 670° C. to 910° C. | 40 | 330 | 910° C. × 3 minutes | 600° C. | −106 |
| 3-13 | B | None | Room temperature to 920° C. | 50 | 220 | None | 710° C. | −106 |
| 3-14 | B | Room temperature to 680° C. | 670° C. to 910° C. | 50 | 290 | 910° C. × 3 minutes | 710° C. | −102 |
| 3-15 | B | None | Room temperature to 920° C. | 50 | 250 | 920° C. × 3 minutes | 710° C. | −99 |
| 3-16 | B | Room temperature to 690° C. | 670° C. to 930° C. | 40 | 320 | 930° C. × 3 minutes | 710° C. | −96 |

Notes)
The soaking after pipe making was performed by heating the interior of the soaking pits to a prescribed temperature and holding the temperature for 3 minutes.
In the quenching step, cooling was performed by water cooling after heating or soaking.
The frequency (Hz) of the treatment condition of the quenching step means the frequency (Hz) of induction heating.
The unit of the heating rate of the treatment condition of the quenching step is ° C./minute.
In the tempering step, after heating to a prescribed temperature, the temperature was held for 15 minutes and air cooling was performed.

[Test Results]

From the results shown in Table 4, the toughness of Inventive examples 3-1 to 3-16 became −96° C. to −125° C. in terms of vTs where a second quenching step was repeatedly added between a first quenching step and a tempering step. The toughness of Inventive examples of Examples 1 and 2 in which the second quenching step is not added is −71° C. to −88° C. Therefore, it could be ascertained that it is possible to improve the toughness of heavy-wall seamless steel pipes obtained by repeatedly adding a second quenching step between a first quenching step and a tempering step.

From the foregoing, if the method of manufacturing a heavy-wall seamless steel pipe of the present invention is used, it is possible to uniformly rapidly heat heavy-wall steel pipes by induction heating at a frequency of not more than 200 Hz and, therefore, it was ascertained that high toughness can be ensured in obtained heavy-wall seamless steel pipes.

INDUSTRIAL APPLICABILITY

The method of manufacturing a heavy-wall seamless steel pipe of the present invention produces the following remarkable effects by heating steel pipes by induction heating at a frequency of not more than 200 Hz in a quenching step:
(1) It is possible to uniformly rapidly heat a steel pipe with a heavy wall thickness.
(2) It is possible to refine grains in a steel pipe.
(3) It is possible to ensure high toughness in a heavy-wall seamless steel pipe to be obtained, and at the same time the steel pipe can be durable in low temperature services.

Therefore, the manufacturing method of the present invention can provide heavy-wall seamless steel pipes suitable for use in oil-well pipes and line pipes.

What is claimed is:

1. A method of manufacturing a heavy-wall seamless steel pipe comprising subjecting a steel pipe with a wall thickness over 30 mm to a quench-and-tempering treatment process comprising a quenching step (a) and a tempering step (b) as below, in the order as described, the pipe being made through a pipe making step by hot working:
(a) a quenching step that involves heating the steel pipe from room temperature to a temperature in the range of not less than 600° C. to nor more than 750° C. by using an atmosphere temperature control heating furnace, thereafter heating the steel pipe to a temperature in the range of not less than 900° C. to not more than 1000° C. by using induction heating at a frequency of not more than 60 Hz in a temperature range of at least not less than 750° C. during the heating stage, and subsequently performing quenching by water cooling; and
(b) a tempering step that involves performing tempering at a temperature in the range of not less than 500° C. to not more than 750° C.

2. The method of manufacturing a heavy-wall seamless steel pipe according to claim 1, wherein the quenching step further involves a soaking treatment in a temperature range of not less than 900° C. to not more than 1000° C. for 10 minutes or less between the induction heating and the quenching.

3. The method of manufacturing a heavy-wall seamless steel pipe according to claim 2, wherein the soaking treatment is performed in an atmosphere temperature control heating furnace.

4. The method of manufacturing a heavy-wall seamless steel pipe according to claim 1, wherein the seamless steel pipe to be subjected to the quench-and-tempering treatment process is water cooled from a temperature of not less than $Ar_3$ point after pipe making by hot working.

5. The method of manufacturing a heavy-wall seamless steel pipe according to claim 2, wherein the seamless steel pipe to be subjected to the quench-and-tempering treatment process is water cooled from a temperature of not less than $Ar_3$ point after pipe making by hot working.

6. The method of manufacturing a heavy-wall seamless steel pipe according to claim 1, wherein the seamless steel pipe to be subjected to the quench-and-tempering treatment process is soaked at a temperature in the range of not less than 900° C. to not more than 1000° C. and is subsequently water cooled after pipe making by hot working.

7. The method of manufacturing a heavy-wall seamless steel pipe according to claim 2, wherein the seamless steel pipe to be subjected to the quench-and-tempering treatment process is soaked at a temperature in the range of not less than 900° C. to not more than 1000° C. and is subsequently water cooled after pipe making by hot working.

8. The method of manufacturing a heavy-wall seamless steel pipe according to claim 1, wherein the quench-and-tempering treatment involves an additional quenching step as set forth in claim 1 between the quenching step as set forth in claim 1 and the tempering step.

9. The method of manufacturing a heavy-wall seamless steel pipe according to claim 2, wherein the quench-and-tempering treatment involves the additional quenching step according to step (a) between the quenching step further involving soaking and the tempering step.

10. The method of manufacturing a heavy-wall seamless steel pipe according to claim 2, wherein the quench-and-tempering treatment involves the additional quenching step involving soaking between the quenching step involving soaking and the tempering step.

11. The method of manufacturing a heavy-wall seamless steel pipe according to claim 3, wherein the quench-and-tempering treatment involves the additional quenching step involving soaking between the quenching step involving soaking in the atmosphere temperature control heating furnace and the tempering step.

12. The method of manufacturing a heavy-wall seamless steel pipe according to claim 4, wherein the quench-and-tempering treatment involves an additional quenching step according to step (a) between the quenching step involving water cooling and the tempering step.

13. The method of manufacturing a heavy-wall seamless steel pipe according to claim 5, wherein the quench-and-tempering treatment involves an additional quenching step according to step (a) between the quenching step involving water cooling and the tempering step.

14. The method of manufacturing a heavy-wall seamless steel pipe according to claim 6, wherein the quench-and-tempering treatment involves an additional quenching step according to step (a) between the quenching step involving water cooling and the tempering step.

15. The method of manufacturing a heavy-wall seamless steel pipe according to claim 6, wherein the quench-and-tempering treatment involves the additional quenching step involving soaking between the quenching step involving water cooling and the tempering step.

16. The method of manufacturing a heavy-wall seamless steel pipe according to claim 1, wherein in performing the induction heating, the seamless steel pipe is induction heated without being transferred in a longitudinal direction during heating by using an induction heating device having a coil length longer than the length of the steel pipe to be induction heated.

17. The method of manufacturing a heavy-wall seamless steel pipe according to claim 2, wherein in performing the induction heating, the seamless steel pipe is induction heated without being transferred in a longitudinal direction during heating by using an induction heating device having a coil length longer than the length of the steel pipe to be induction heated.

* * * * *